June 25, 1963 R. A. ANDERSON 3,095,081
TRANSFER MECHANISM
Filed Aug. 7, 1961 2 Sheets-Sheet 1

INVENTOR
Raymond A. Anderson
By William J. Newman
Attorney

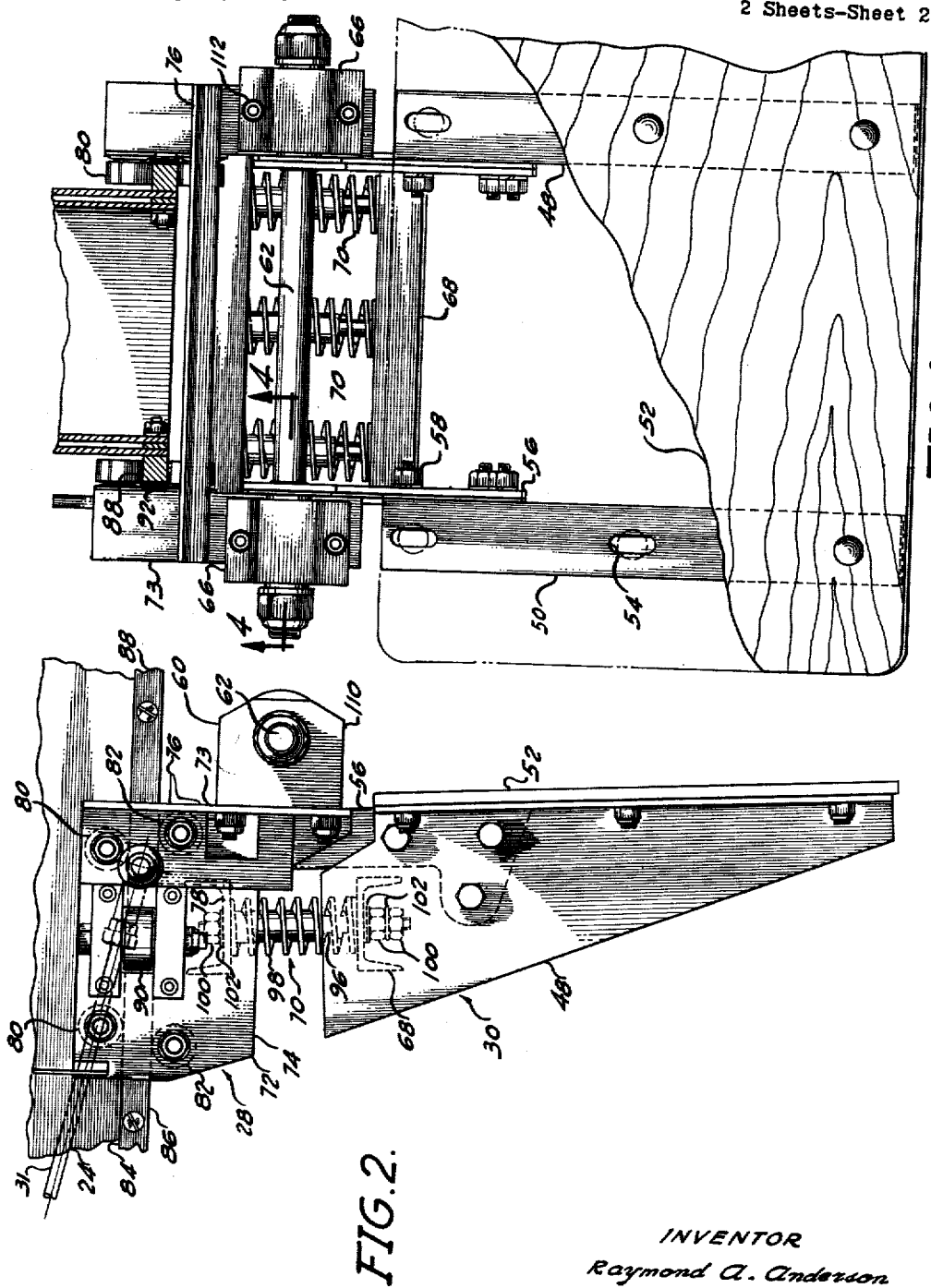

United States Patent Office 3,095,081
Patented June 25, 1963

3,095,081
TRANSFER MECHANISM
Raymond A. Anderson, Wood Dale, Ill., assignor to Stewart-Warner Corporation, Chicago, Ill., a corporation of Virginia
Filed Aug. 7, 1961, Ser. No. 129,600
7 Claims. (Cl. 198—24)

This invention relates to high speed conveyors and more particularly to an improved transfer mechanism for such conveyors.

The rapid development in automation of manufacturing processes carried on in large industrial plants has resulted in a definite need for high speed conveying systems for moving various objects, such as articles or packages, rapidly from one area to another. Since such conveyor systems generally employ a number of moving conveyor belts or other apparatus which may have intersections as well as a number of loading or discharge stations, there is the further requirement of a transfer mechanism which operates at extremely high speeds to accurately load and discharge the package to and from the conveyor. With present day conveying systems having belts, or the like, operating at lineal speeds of 300 feet per minute, or more, it can be appreciated that the transfer mechanisms must also move at extremely high speeds in order to ensure that packages are removed at the required station.

As an example of a high speed transfer mechanism for use with a high speed conveyor system, reference is made to the copending application of Warren E. Graybeal, Serial No. 18,614, filed March 30, 1960, now Patent No. 3,045,801. Therein is described an improved transfer mechanism for a high speed conveyor system with which objects are accurately removed at high speeds, regardless of the size and mass of the objects within predetermined limits. The high speed transfer mechanism allows relatively close spacing of the objects upon the conveyor belt.

The mass of the transfer mechanism must, of course, be substantial to remove the heaviest objects from the conveyor belt. The high velocity of the transfer mechanism plus the high mass of the parts engaging the package cause very high impact forces which are imparted, not only to the package, but also to the transfer mechanism structure. It is an object of this invention to reduce the initial shock of the impact forces of the high velocity, high mass system. More particularly it is an object of this invention to reduce the impact forces by providing adequate spring-loaded, shock-absorbing means.

The use of spring-type, shock-absorbing means to reduce initial impact introduces other problems, however, into the transfer mechanism device. The springs permit mechanical vibrations, or oscillations, to be sustained in the device when forces due to impact with a package are properly related to the resonances within the transfer mechanism. It is, therefore, another object of this invention to provide means for damping any mechanical vibrations or oscillations.

Other objects and advantages of this invention will become apparent upon a further reading of this specification especially when taken in view of the accompanying drawings in which:

FIG. 2 is an elevation fragmentary view of the transfer paddle assembly for the transfer mechanism shown in FIG. 1;

FIG. 3 is a front elevation of the transfer paddle assembly;

Figure 1:
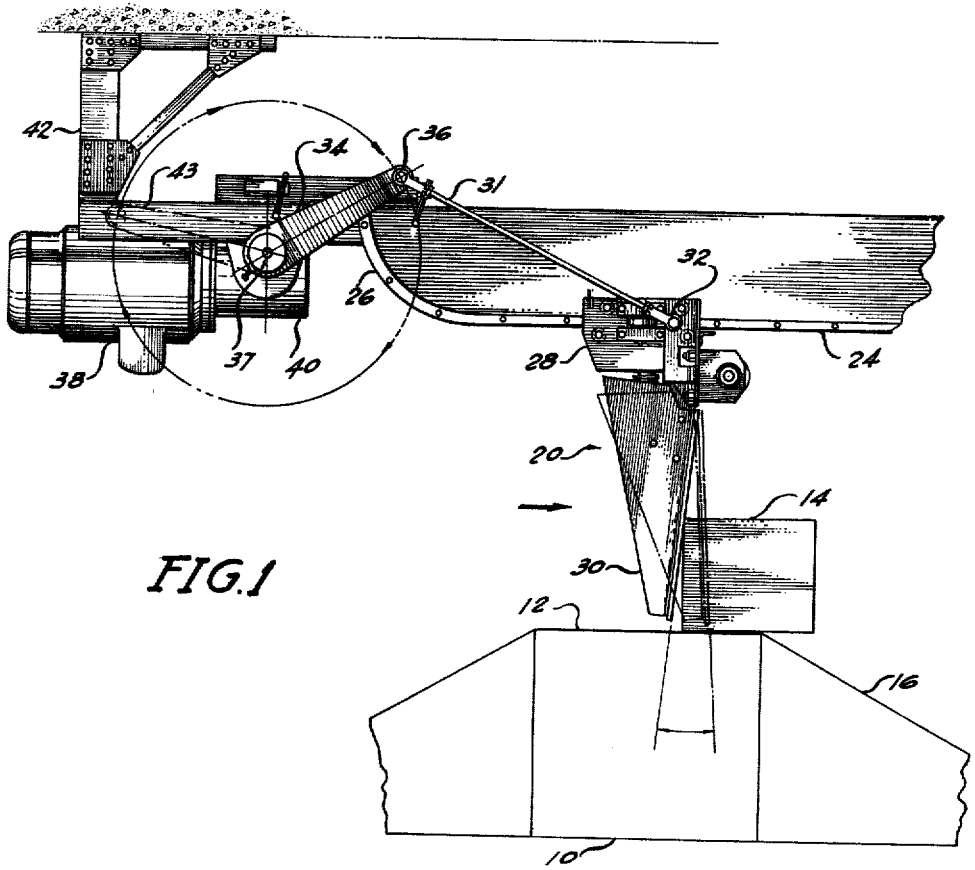
FIG. 1 is an elevation view of a transfer mechanism utilizing the teachings of this invention.

Referring now to FIG. 1, there is shown a high speed conveyor system, indicated generally at 10, which includes a high speed horizontal belt member 12 upon which is positioned a plurality of objects, such as packages 14, which may be irregular in size within predetermined limits. A discharge station is represented by the inclined line 16, any number of which may be positioned along the conveyor belt. The transfer mechanism shown in FIG. 1 makes use of a single paddle assembly 20 positioned to the left of the conveyor belt 12 upon a laterally extending track member 24 so that the paddle member may reciprocate laterally across the area immediately above the horizontally moving belt member 12 to sweep or discharge any packages 14 onto the discharge station 16. While track member 24 is essentially horizontal and at right angles to the axis of the conveyor belt, the terminal or end portion of the track member 24 is curved upwardly as at 26 in such a manner that the paddle assembly 20 moves only horizontally along the line of travel in the vicinity of the conveyor belt and rotates or pivots as it approaches the curved portion 26 of track member 24.

The paddle assembly 20 comprises a rider member 28 to which a paddle structure or member 30 is pivotally and resiliently mounted in a manner to be hereinafter described. A connecting rod 31 is pivotally connected to the rider member 28, such as at pivot point 32, while the opposite end of the connecting rod 30 is pivotally connected at crank pin 36 to a crank arm member 34 by any suitable means. The crank member 34 is rotated about an axis defined by crankshaft 37 by suitable power means such as an electric motor 38, the motor 38 incorporating a gear box 40 of the conventional type for providing a desired angular velocity to the crank arm 34. A support member 42 acts to support the motor 38 as well as the transverse track member 24.

Rotation of the crankshaft 37 by the motor 38 and a gear means within the box 40 results in the paddle assembly 20 being reciprocated linearly across the track from one extreme position to the other, the connecting rod and the paddle assembly moving with simple harmonic motion. With this type of system the initial load on the motor is at a minimum when the paddle member starts to move across the conveyor belt from an at rest position indicated by the phantom representation of the crank arm at 43. The linear velocity of the paddle assembly 20 is at a maximum at the time of impact with the object of the conveyor thereby providing maximum momentum of the paddle assembly for initially contacting and starting the package off the conveyor.

As was hereinbefore mentioned, the paddle member 30 of the paddle assembly is pivotally and resiliently supported by the rider member 28 in order to reduce the shock effects of the paddle striking the package 14 with a high momentum. That is, a package 14 of substantial mass would cause a large frictional resistance to the forces pushing it off the conveyor 12. The package, as well as the transfer mechanism, would receive a severe shock when the paddle assembly engages the package, were it not for the shock absorber provided. The impact forces transmitted to the package 14, as well as those reflected back to the motor and gear box through the connecting rod 31, might be substantial enough to cause damage.

Figure 4:
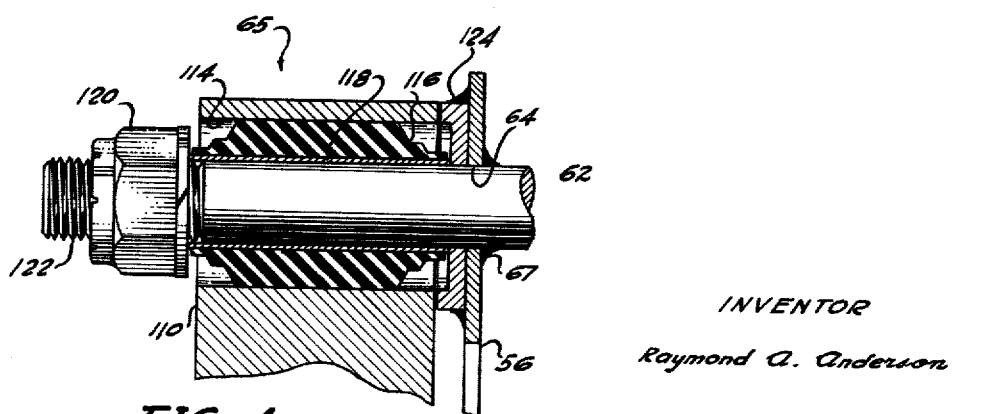
FIG. 4 is a fragmentary section view of a joint assembly taken along the lines 4—4 of FIG. 3.

Referring now to FIGS. 2 and 3, the paddle member 30 includes a pair of metallic plate support members 48, including outwardly directing flange portions 50 to which are attached a board 52 forming the contact surface of the paddle assembly. The board is rigidly coupled to the pair of metallic support members 48 by conventional bolts or other means, passing through the slots 54. Each of the plate support members 48 carries a bracket member 56 which is bolted to its inner facing surface by suitable bolts 58. Each bracket 56 has a projecting portion 60 integral with its extending end. A pivot shaft 62 extends between the portions 60 of the bracket members 56 and through apertures 64 therein (FIG. 4) to engage joint assemblies 66 mounted on the rider member 28. The shaft 62 is securely joined to each bracket member 56 by any suitable means such as welding as shown at 67 (FIG. 4).

A channel beam 68 also extends between the plate members 48 and is secured thereto by suitable means, such as by welding, so as to provide structural strength for the paddle member 30 as well as provide mounting support for shock absorber assemblies 70. The paddle member comprising the side members 48, paddle 52, bracket members 56 and channel beam 68 form a rigid unit which is pivotable about the axis of its pivot shaft 62 journaled in the joint assemblies 66.

The rider member 28 comprises a pair of spaced side members 72, each made up of a flanged front member 73 and a mounting plate 74 welded thereto. The side members 72 are rigidly interconnected by a support bar 76 welded to the flanges at the front end thereof, and by a channel beam 78 extending between, and welded to, the mounting plates 74. The channel beam 78 serves to add structural strength to the rider member 28, as well as provide a mounting base for the other ends of the shock absorbers 70. Each of the side members 72 has pairs of rollers 80 and 82 which are adapted to engage the respective opposing surfaces 84 and 86 of the flange 88 on the track member 24. There is also a fifth roller 90 on each mounting side member 74 in engagement with the side surfaces 92 on the flange 88 of the track member 24 to maintain the alignment of the paddle assembly 20 as it travels along the track member 24.

The shock absorber assemblies 70 each comprise a stud bolt 96 having threaded portions at either end extending through confronting apertures (not shown) in the channel members 68 and 78. A helical spring 98 surrounds the stud pin 96 between the channel beams 68 and 78 so as to provide opposing forces between the two beams to bias the paddle member 30 away from the rider member 28. Appropriate nuts 100 and washers 102 are provided on the threaded portions at either end of the stud bolt 96 to provide the bias limit as well as adjusting means for determining the preloading on the springs 98. The aperture (not shown) in one or both of the channel beams 68, 78 through which the stud pin 96 extends is preferably elongated or enlarged to prevent binding as the paddle member 30 rotates about its shaft 62.

The shock absorber assemblies 70 are prestressed to a degree commensurate with the impact force which is considered damaging to the transfer mechanism and the packages on the conveyor. The effective force at the center of the contacting area on the paddle will, of course, be substantially smaller than the actual prestress force of the shock absorber assemblies because of their respective angular moments about the pivot point defined by the shaft 62.

The flexible joint assemblies 66 each comprise an aluminum block 110 (FIG. 2) secured to the flanged front member 73 on the rider member 28 by suitable bolts 112. As shown in FIG. 4, each block 110 has a bore 114 through which the shaft 62, rigidly connected to the paddle member 30, extends. A tubular rubber socket member 116, in adherence with a tubular-steel inner-sleeve 118, is carried by the pivot shaft 62. An elastic lock nut 120, in engagement with the threaded end portion 122 of the pivot shaft 62, captures the steel inner-sleeve 118 pressing it against a circular disc member 124 welded to the bracket 56 on the paddle member 30, so as to rotate with the paddle member 30 about the axis of the shaft 62. Thus, the bracket member 56 of the paddle member 30, shaft 62, disc 124, sleeve 118 and lock nut 120 will all rotate within the through-bore 114 in the aluminum block 110 responsive to the paddle member 30 engaging a heavy package on the conveyor belt. The compression of the rubber tubular member 116 in the through-bore 114 allows calibrated resistivity and will not slip as the paddle member rotates.

The periphery of the tubular rubber member 116 may be made to adhere to the aluminum block by assembling the joint in the following manner. Before assembly the rubber member 116 is liberally coated with linseed oil which is used as an assembly lubricant and is then compressed and fit into the through-bore 114 in the aluminum block 110 by means of a cone-shaped tool. The shaft 62 of the paddle member 30 is inserted through the inner-sleeve 118 and the elastic lock nut 120 is threaded onto the end of the shaft 162 so as to capture the sleeve between the nut 120 and the annular disc 124. The compression of the rubber into the aluminum provides a tight bond which will not release under any normal forces expected.

This type of joint provides a flexible, rotatable pivot for the paddle assembly 20. Within the limits of the shear stresses in the rubber member 116, it also provides a resilient support which coacts with the shock absorber assemblies 70 to lessen the impact when the transfer mechanism is operated to remove a heavy mass package from the conveyor. Further, the flexible joint reduces the effect of any vibrations which may be set up within the paddle member 30 on the rest of the transfer mechanism. The rubber member 116 absorbs such vibrations so that very little, if any, will be transferred through the rider member 28 and connecting rod 31 to the driver unit.

This invention, therefore, provides a transfer mechanism in which the severe impact forces are readily absorbed by the paddle assembly so as not to be imparted to the package being transferred, or reflected back to the paddle driving means. The unique assembly also reduces the vibrations which may be set up due to mechanical resonances within the paddle mechanism which also may be damaging to the driving means.

While there has been described a preferred embodiment of the invention, it is to be understood that many other configurations may be developed from these teachings. It is, therefore, intended that this invention be limited, not by the preceding drawings and description, but only by the scope of the appended claims.

What is claimed is:

1. In a transfer mechanism for transferring an object to and from a moving conveyor member including a paddle assembly translatable along a horizontal support member transversely positioned above said conveyor member and means for reciprocating the paddle assembly along the horizontal support member from a position adjacent one side of the conveyor to a position whereat the paddle assembly engages the object, said paddle assembly comprising a rider member in translatable engagement with said horizontal support member, a paddle member rigidly supporting a pivot shaft, means on said rider member flexibly and resiliently journaling said shaft for rotation about an axis aligned in a direction parallel with the movement of said conveyor member, and spring means between said paddle member and said rider member to absorb shock forces when said paddle member encounters a heavy object on the conveyor.

2. In a transfer mechanism for transferring an object to and from a moving conveyor member including a paddle assembly translatable along a horizontal support member transversely positioned above said conveyor member and means for reciprocating the paddle assembly along the horizontal support member from a position adjacent one side of the conveyor to a position whereat the paddle assembly engages the object, said paddle assembly comprising a rider member in translatable engagement with said horizontal support member, a paddle member rigidly supporting a pivot shaft, means on said rider member flexibly and resiliently journalling said shaft for rotation about an axis aligned in a direction parallel with the movement of said conveyor member.

3. In a transfer mechanism for transferring an object to and from a moving conveyor member including a paddle assembly translatable along a horizontal support member transversely positioned above said conveyor member and means for reciprocating the paddle assembly along the horizontal support member from a position adjacent one side of the conveyor to a position whereat the paddle assembly engages the object, said paddle assembly comprising a rider member engaging said horizontal support and translatable therealong in a direction transverse to the direction of conveyor travel, a pair of journal housings rigidly fixed on said rider member each having a through-bore in alignment with one another along an axis parallel to said conveyor, a paddle member having a package engaging surface aligned parallel to the direction of conveyor travel, a pivot shaft rigidly carried by the paddle member with its ends extending through said journal housing through-bores, a steel sleeve surrounding each shaft end within the respective through-bore in locking engagement therewith, a tubular rubber member within the through-bore of each of said journal housings in adherent engagement with said journal housing and said sleeve along its outer and inner peripheries respectively, a spring base member carried by each of said rider and paddle members having mutually facing surfaces and aligned apertures therein, a stud bolt extending through said aligned apertures, a nut in threaded engagement with each end of the bolt, and a helical spring surrounding said bolt and constrained between said mutually facing surfaces to bias said paddle member away from said rider member about the axis of said pivot shaft.

4. In a transfer mechanism for transferring an object to and from a moving conveyor member including a paddle assembly translatable along a horizontal support member transversely positioned above said conveyor member and means for reciprocating the paddle assembly along the horizontal support member from a position adjacent one side of the conveyor to a position whereat the paddle assembly engages the object, said paddle assembly comprising a rider member engaging said horizontal support and translatable therealong in a direction transverse to the direction of conveyor travel, a pair of journal housings rigidly fixed on said rider member each having a through-bore in alignment with one another along an axis parallel to said conveyor, a paddle member having a package engaging surface aligned parallel to the direction of conveyor travel, a pivot shaft rigidly carried by the paddle member with its ends extending through said journal housing through-bores, a steel sleeve surrounding each shaft end with the respective through-bore in locking engagement therewith, a tubular rubber member within the through-bore of each of said journal housings in adherent engagement with said journal housing and said sleeve along its outer end and inner peripheries respectively.

5. In a transfer mechanism for transferring an object to and from a moving conveyor including a paddle assembly translatable along a horizontal track transversely positioned above said conveyor and means for reciprocating the paddle assembly along the horizontal track from a position adjacent one side of the conveyor to a position whereat the paddle assembly engages the object, said paddle assembly comprising a rider member in translatable engagement with said horizontal track, a paddle member, a shaft rigidly supported by one of said members, means on said other member flexibly and resiliently journaling said shaft for rotation about an axis aligned in a direction parallel with the movement of said conveyor and spring means between said paddle member and said rider member to absorb forces when said paddle member encounters a heavy object on the conveyor.

6. In a transfer mechanism for transferring an object to and from a moving conveyor including a paddle assembly translatable along a horizontal track transversely positioned above said conveyor and means for reciprocating the paddle assembly along the horizontal track from a position adjacent one side of the conveyor to a position whereat the paddle assembly engages the object, said paddle assembly comprising a rider member translatable along said horizontal track in a direction transverse to the direction of conveyor travel, a paddle member having a package engaging surface aligned parallel to the direction of conveyor travel, a pair of journal housings rigidly fixed on one of said members each having a through-bore in alignment with one another along an axis parallel to said conveyor, a pivot shaft rigidly carried by the other member with its ends extending through said journal housing through-bores, a steel sleeve surrounding each shaft end within the respective through-bore in locking engagement therewith, a tubular rubber member within the through-bore of each of said journal housings in adherent engagement with said journal housings and said sleeve along its outer and inner peripheries respectively, a spring base member carried by each of said rider and paddle members having mutually facing surfaces and aligned apertures therein, a stud bolt extending through said aligned apertures, a nut in threaded engagement with each end of the bolt, and a helical spring surrounding said bolt and constrained between said mutually facing surfaces to bias said paddle member away from said rider member about the axis of said pivot shaft.

7. In a transfer mechanism for transferring an object to and from a moving conveyor including a paddle assembly translatable along a horizontal track transversely positioned above said conveyor and means for reciprocating the paddle assembly along the horizontal track from a position adjacent one side of the conveyor to a position wherat the paddle assembly engages the object, said paddle assembly comprising a rider member translatable along said horizontal track in a direction transverse to the direction of conveyor travel, a paddle member having a package engaging surface aligned parallel to the direction of conveyor travel, a pivot shaft rigidly carried by one of said members, a pair of journals in alignment with one another along an axis parallel to said conveyor and receiving the ends of said shaft, a spring base member carried by each of said rider and paddle members having mutually facing surfaces and aligned apertures therein, a stud bolt extending through said aligned apertures, a nut in threaded engagement with each end of the bolt, and a helical spring surrounding said bolt and constrained between said mutually facing surfaces to bias said paddle member away from said rider member about the axis of said pivot shaft.

References Cited in the file of this patent
UNITED STATES PATENTS

| | | |
|---|---|---|
| 1,839,375 | Covey | Jan. 5, 1932 |
| 3,026,988 | Fisk | Mar. 27, 1962 |

UNITED STATES PATENT OFFICE

CERTIFICATE OF CORRECTION

Patent No. 3,095,081                                              June 25, 1963

Raymond A. Anderson

It is hereby certified that error appears in the above numbered patent requiring correction and that the said Letters Patent should read as corrected below.

Column 4, line 62, for "sadi" read -- said --; column 5, line 56, strike out "end".

Signed and sealed this 11th day of February 1964.

(SEAL)
Attest:
ERNEST W. SWIDER                                           EDWIN L. REYNOLDS Attesting Officer                                        Acting Commissioner of Patents